United States Patent [19]

Ford, Jr. et al.

[11] 3,876,726

[45] Apr. 8, 1975

[54] VINYL ESTER URETHANES

[75] Inventors: Ernest C. Ford, Jr., Newark; Alfred J. Restaino, Wilmington, both of Del.

[73] Assignee: ICI America Inc., Wilmington, Del.

[22] Filed: May 29, 1973

[21] Appl. No.: 364,912

[52] U.S. Cl.................. 260/859 R; 260/77.5 CR
[51] Int. Cl............................................. C08g 41/04
[58] Field of Search................ 260/859 R, 77.5 CR

[56] References Cited
UNITED STATES PATENTS

| | | | |
|---|---|---|---|
| 3,297,745 | 1/1967 | Fekete | 260/77.5 AP |
| 3,371,056 | 2/1968 | Delius | 260/859 R |
| 3,509,234 | 4/1970 | Burlant | 260/859 |
| 3,641,199 | 2/1972 | Niederhauser | 260/859 |
| 3,642,943 | 2/1972 | Noel | 260/859 |
| 3,677,920 | 7/1972 | Kai | 260/859 |

FOREIGN PATENTS OR APPLICATIONS 2,120,399   11/1971   Germany

Primary Examiner—Paul Lieberman

[57] ABSTRACT

Vinyl ester urethane resins are disclosed. These resins have the following general formula:

$$R\text{--}(A\text{--}M)_y\text{--}A\text{--}I\text{--}B$$

wherein
A is a radical derived from a polyoxyalkylene bisphenol A;
M is a radical derived from an unsaturated, aliphatic, dicarboxylic acid or an anhydride thereof;
I is a radical derived from a diisocyanate;
B is a radical derived from a hydroxyl-terminated ester of acrylic or methacrylic acid;
y is an integer equal to from 1 to about 5; and
R is selected from the group consisting of hydroxyl, I, and I—B, wherein I and B are as defined above.

The resins are prepared by reacting (a) the reaction product of a polyoxyalkylene bisphenol A and an unsaturated, aliphatic, dicarboxylic acid or anhydride; (b) a diisocyanate; and (c) a hydroxyl-terminated ester of acrylic or methacrylic acid.

37 Claims, No Drawings

VINYL ESTER URETHANES

BACKGROUND OF THE INVENTION

1. Field of the Invention

The present invention relates generally to vinyl ester urethane resins, to methods of preparing said resins, and to compositions containing said resins. More particularly, the invention relates to vinyl ester urethane resins having the following general formula:

R $+$A—M$+_y$ A—I—B wherein
A is a radical derived from a polyoxyalkylene bisphenol A;
M is a radical derived from an unsaturated, aliphatic, dicarboxylic acid or an anhydride thereof;
I is a radical derived from a diisocyanate;
B is a radical derived from a hydroxyl-terminated ester of acrylic or methacrylic acid;
y is an integer equal to from 1 to about 5; and
R is selected from the group consisting of hydroxyl, I, and I—B, wherein I and B are as defined above.

The resins are prepared by reacting a diisocyanate and a hydroxyl-terminated ester of acrylic or methacrylic acid with the condensation product prepared by reacting a polyoxyalkylene bisphenol A with an unsaturated, aliphatic, dicarboxylic acid or anhydride. The resins are particularly useful in compositions comprising the vinyl ester urethane and a vinyl or allyl monomer.

2. Description of the Prior Art

Polyurethanes prepared by reacting an isocyanate with an active hydrogen-containing compound are well known in the art. The active hydrogen-containing compounds employed in the preparation of polyurethanes may be any of a wide variety of materials, including both polyesters and polyethers.

Vinyl urethane resins prepared by reacting an isocyanate, a polyol, and a hydroxyl-terminated ester of acrylic or methacrylic acid are also known in the art. However, the utility of the previously available vinyl urethane resins has been limited due to the limited range of properties achievable with those resins.

In accordance with the present invention, it has been found that vinyl ester urethane resins having improved properties are prepared when, as the polyhydroxy compound, there is utilized a material prepared by reacting a polyoxyalkylene bisphenol A with an unsaturated, aliphatic, dicarboxylic acid.

SUMMARY OF THE INVENTION

In accordance with the present invention, vinyl ester urethane resins are prepared having the following general formula:

R $+$A—M$+_y$ A—I—B wherein
A is a radical derived from a polyoxyalkylene bisphenol A;
M is a radical derived from an unsaturated, aliphatic, dicarboxylic acid or an anhydride thereof;
I is a radical derived from a diisocyanate;
B is a radical derived from a hydroxyl-terminated ester of acrylic or methacrylic acid;
y is an integer equal to from 1 to about 5; and
R is selected from the group consisting of hydroxyl, I, and I—B, wherein I and B are as defined above.

The resins are prepared from a diisocyanate, a hydroxyl-terminated ester of acrylic or methacrylic acid, and a product prepared by reacting a polyoxyalkylene bisphenol A with an unsaturated, aliphatic, dicarboxylic acid.

DESCRIPTION OF THE PREFERRED EMBODIMENTS

The present invention relates to vinyl ester urethane resins having the following general formula:

R $+$A—M$+_y$ A—I—B wherein
A is a radical derived from a polyoxyalkylene bisphenol A;
M is a radical derived from an unsaturated, aliphatic, dicarboxylic acid or an anhydride thereof;
I is a radical derived from a diisocyanate;
B is a radical derived from a hydroxyl-terminated ester of acrylic or methacrylic acid;
y is an integer equal to from 1 to about 5; and
R is selected from the group consisting of hydroxyl, I, and I—B, wherein I and B are as defined above.

These vinyl ester urethane resins are preferably prepared from a polyoxyalkylene bisphenol A maleate or fumarate, a diisocyanate, and a hydroxyl-terminated ester of acrylic or methacrylic acid. Each of the components which may be employed in the preparation of the resins of the present invention is described in detail below.

Bisphenol A Derivative

The bisphenol A derivative employed in the preparation of the vinyl ester urethane resins of the present invention may be described as a condensate of a polyoxyalkylene bisphenol A and an unsaturated, aliphatic, dicarboxylic acid. These materials may be prepared by, first, reacting a bisphenol A with an alkylene oxide and, subsequently, reacting the polyoxyalkylene bisphenol A with an unsaturated, aliphatic, dicarboxylic acid or an anhydride derived from an unsaturated, aliphatic, dicarboxylic acid.

As is well known to those skilled in the art, bisphenol A refers to the following compound:

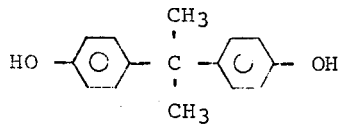

In addition to this material, substituted derivatives of bisphenol A may also be utilized in preparing the resins of the present invention. If substituted derivatives are employed, it is preferred to utilize those having the following general formula:

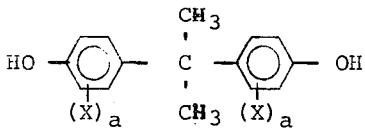

wherein X is selected from the group consisting of halogen and methyl and a is an integer equal to 1 or 2. Especially preferred bisphenol A derivatives are those represented by the above general formula wherein X is selected from the group consisting of chlorine, bromine, and fluorine. It should also be noted that, although X may be methyl, when X is methyl and the methyl group is ortho to the hydroxyl group, it is somewhat more difficult to prepare the polyoxyalkylene derivatives discussed below.

The polyoxyalkylene derivatives of the bisphenol A are prepared by reacting the bisphenol A with an alkylene oxide. Suitable alkylene oxides which may be employed include, for example, ethylene oxide and propylene oxide. The preferred polyoxyalkylene derivatives of bisphenol A useful in the present invention may be represented by the following general formula:

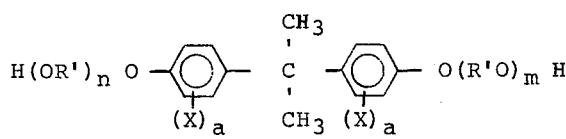

wherein
R' is an alkylene group,
X is halogen or methyl,
$a$ is an integer equal to from 0 to 2, and
$m$ and $n$ are integers each of which is equal to at least 1 and the sum of which is equal to from about 2 to about 6.

The sum of $m$ and $n$ in the above formula is determined by the number of mols of alkylene oxide reacted with each mol of bisphenol A. Thus, in preparing the polyoxyalkylene derivatives of bisphenol A useful in the present invention, at least 2 mols of alkylene oxide should be reacted with each mol of bisphenol A. Preferred results are achieved when the number of mols of alkylene oxide utilized—i.e., the sum of $m$ and $n$ in the above formula— is equal to from about 2 to about 6. It has been found that, as the amount of alkylene oxide employed is increased, the properties of the resins change and certain of said properties such as flexural strength and elongation improve but, at the same time, other properties such as heat distortion temperature and tensile strength decrease. It is, therefore, necessary to select the amount of alkylene oxide employed to achieve a resin having the desired properties. It should be noted that, although resins can be prepared from bisphenol A derivatives wherein the sum of m and n is equal to greater than about 6, these resins are extremely soft and are, therefore, not within the preferred materials of the present invention. Especially preferred results are achieved with derivatives in which the sum of $m$ and $n$ is equal to from 2 to about 4.

In the especially preferred polyoxyalkylene bisphenol A derivatives, R' in the above formula is an alkylene group containing from 2 to 3 carbon atoms.

The bisphenol A derivatives useful in the preparation of vinyl ester urethane resins in accordance with the present invention are prepared by reacting the polyoxyalkylene bisphenol A derivatives described above with an unsaturated, aliphatic, dicarboxylic acid or an anhydride thereof. Unsaturated dicarboxylic acids which may be employed in preparing derivatives useful in the present invention include, for example, maleic acid and fumaric acid. Anhydrides which may also be utilized include maleic anhydride.

In preparing the bisphenol A derivatives, there may also be employed a minor amount of a second polycarboxylic acid such as, for example, phthalic acid or trimellitic acid. This second acid may be either of the aromatic or aliphatic type and may be either saturated or unsaturated. However, the preferred bisphenol A derivatives for use in the preparation of the resins of the present invention are those which contain only the unsaturated, aliphatic, dicarboxylic materials mentioned above.

The amount of unsaturated, aliphatic, dicarboxylic acid or anhydride employed in the preparation of the bisphenol A derivative should be such that the mol ratio of alkoxylated bisphenol A to acid or anhydride is equal to from about 2:1 to about 6:5. If either more than or less than this amount is employed, the resins will not exhibit the improved properties mentioned above and discussed in detail below.

Representative polyoxyalkylene bisphenol A derivatives which may be employed include, for example, polyoxypropylene(2) bisphenol A, polyoxyethylene(2.2)bisphenol A, polyoxypropylene(2.2)tetrabromobisphenol A, polyoxypropylene(3)bisphenol A, and polyoxypropylene(4)bisphenol A.

Isocyanate

In preparing the vinyl ester urethane resins of the present invention, any diisocyanate, such as toluene diisocyanate and methylene diisocyanate, may be employed. Preferred results are achieved when either of the above-mentioned diisocyanates are employed. However, the use of methylene diisocyanate results in resins which are more darkly colored, more expensive, and more susceptible to oxidation. It is, therefore, especially preferred to employ toluene diisocyanate in the preparation of the resins of the present invention. As is well known to those skilled in the art, toluene diisocyanate is frequently employed as a mixture of the 2,4 and 2,6 isomers.

The amount of toluene diisocyanate employed should be equal to at least 1 mol per mol of bisphenol A derivative employed. When 1 mol is employed, R in the formula given above for the resins of the present invention will be a hydroxyl group. However, additional isocyanate may be utilized and preferred results have been achieved with an amount of isocyanate equal to at least about 1.4 mols of isocyanate per mol of bisphenol A derivative. Although more than this amount of isocyanate may be employed, it has been found that no further improvements in properties are achieved when more than about 2.5 mols of isocyanate are added. The reason for this result is believed to be due to the fact that this amount is well in excess of the theoretical amount required to react with all of the active hydrogen atoms in the reaction mixture.

ESTER OF ACRYLIC OR METHACRYLIC ACID

The hydroxyl-terminated ester of acrylic or methacrylic acid which may be employed in accordance with the present invention has the following general formula:

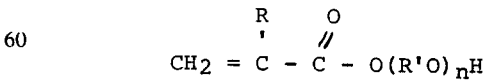

wherein
R is hydrogen or methyl,
R' is an alkylene group containing 2 or 3 carbon atoms, and
$n$ is an integer equal to from 1 to about 3.

These materials are prepared by reacting acrylic acid or methacrylic acid with an alkylene oxide selected from the group consisting of ethylene oxide and propylene oxide. The reaction is carried out be methods which are well known in the art. The integer n in the above formula is determined by the mols of alkylene oxide employed per mol of acrylic or methacrylic acid. In accordance with the present invention, it has been found that the desired vinyl ester urethane resins are prepared only from materials wherein this number has a value equal to from at least 1 to about 3. If more than about 3 mols of alkylene oxide are employed, the resulting resins have a lower heat distortion temperature and reduced physical properties such as tensile strength and flexural strength. Also, as the value of n is increased, the corrosion resistance of the resulting resins has been found to decrease and it is, therefore, desirable to maintain this value as low as possible. Preferred results have been achieved with resins in which this value of n was equal to from 1 to about 2.

Representative materials which may be employed include, for example, hydroxyl propyl methacrylate, hydroxy ethyl methacrylate, hydroxy ethyl acrylate, hydroxy propyl acrylate, polyoxyethylene(2)acrylate, polyoxyethylene(2)methacrylate, polyoxyethylene(3)acrylate, polyoxyethylene(3)methacrylate, polyoxypropylene(2)acrylate, polyoxypropylene(2)methacrylate, polyoxypropylene(3)acrylate, and polyoxypropylene(3)methacrylate.

The amount of acrylate or methacrylate employed should be equal to at least 1 mol per mol of bisphenol A derivative utilized. This amount results in a resin in which at least 50 percent of the hydroxyl groups of the bisphenol A derivative are reacted with the acrylate or methacrylate through the TDI molecule. Additional amounts of the acrylate or methacrylate may also be employed. Preferred results are achieved when 1 mol of acrylate or methacrylate is utilized for each mol of isocyanate employed.

The acrylate or methacrylate may be employed either as a single compound or as a mixture of two or more compounds. Preferred results are achieved with hydroxy propyl methacrylate.

The vinyl ester urethane resins of the present invention may be prepared by a one-shot method or, alternatively, by, first, reacting two of the components and, subsequently, reacting the prepolymer resulting therefrom with the third component. The resins may be prepared as a melt without the use of any solvent or the reaction may be carried out in the presence of a suitable solvent. If a solvent is employed, a vinyl monomer such as those mentioned below is preferred.

In the one-shot method, all of the components; that is, the bisphenol A derivative, the diisocyanate, and the hydroxylterminated ester of acrylic or methacrylic acid, are combined and the resulting reaction mixture is heated until substantially all of the isocyanate has been reacted. This point is determined by methods which are well known in the art. If prepared without the use of a solvent, it is preferred to, first, melt the bisphenol A derivative and combine this melt with the ester of acrylic or methacrylic acid. The diisocyanate is then added gradually and the reaction temperature allowed to increase to at least about 125°C. The reaction mixture is then held at about this temperature until completion of the reaction. If a vinyl monomer is employed in the reaction mixture, it is preferred to utilize styrene or chlorostyrene. In this case, all of the components are added to the monomer and the resulting reaction mixture heated at a temperature of from about 50°C. to about 85°C. until the reaction is completed. The actual temperature employed may be varied depending upon the reactants utilized, the reaction time and the like.

If a prepolymer technique is employed, it is preferred to first react the diisocyanate with the hydroxyl-terminated ester of acrylic or methacrylic acid and to, subsequently, add this bisphenol A derivative to the resulting product. When such a technique is employed, there should also be included in the reaction mixture a polymerization inhibitor such as hydroquinone and, if desired, an antioxidant such as 2,6-ditertiary butyl-4-methyl phenol.

When this prepolymer technique is utilized, the diisocyanate and hydroxyl-terminated ester of acrylic or methacrylic acid are first heated at a temperature of about 50°C. for a period of time of from about 1 to about 4 hours. At the end of this time, the bisphenol A derivative is added and the reaction mixture heated for from about 4 to about 6 hours at temperatures of from about 50°C. to about 85°C. As will be apparent to those skilled in the art, the reaction time and temperature are interdependent variables and, as such, may be varied over a wide range. Thus, for example, if the reaction temperature is increased, the time required for completion of the reaction may be decreased. Here, also, the prepolymer may be prepared either as a melt or as a solution in styrene. Also, the final component added to the prepolymer may be added in a melted form or as a solution in styrene. In addition to the preferred prepolymer technique mentioned above, the bisphenol A derivative may be reacted with the toluene diisocyanate to form a prepolymer which is then reacted with the hydroxyl-terminated ester of acrylic or methacrylic acid.

The resulting vinyl ester urethane resins have been found to be especially useful in compositions wherein they are combined with a vinyl monomer in which they are soluble. As mentioned above, it is possible by including the vinyl monomer in the reaction mixture to prepare these compositions directly. Alternatively, the vinyl ester urethane may be dissolved in a suitable vinyl monomer prior to use. Suitable vinyl monomers which may be employed in preparing compositions comprising the vinyl ester urethane resins are well known in the art and include, for example, styrene, chlorostyrene, t-butyl styrene, divinyl benzene, vinyl toluene, vinyl acetate, vinyl propionate, acrylic and methacrylic acid esters, diallyl phthalate, diallyl fumarate, and triallyl cyanurate. Of these, it is preferred to employ styrene or chlorostyrene.

The amount of monomer employed in these compositions can be varied over a wide range depending upon the intended use of the composition. In addition to the vinyl ester urethane resin and monomer, the compositions of the present invention may also include any of those additives which are conventionally employed in the preparation of such compositions. These include, for example, catalysts to accelerate the cross-linking reaction which occurs when the composition is cured; pigments to add color to the cured product; fire-retardant additives; fibers, such as glass and polypropylene, to improve the strength of products prepared from said compositions; and fillers, such as antimony oxide, silicon oxides, magnesium oxide, and boron oxides, to alter the physical properties of said products.

These compositions are particularly useful in the preparation of castings, laminates, composites, and filaments.

The solid vinyl ester urethane resins are also useful in, for example, moldings and castings.

The vinyl ester urethane resins of the present invention are characterized by their improved properties especially when compared with the previously available vinyl urethane resins. The resins of the present invention exhibit increased heat distortion temperatures, excellent corrosion resistance especially when exposed to hypochlorite solutions, and are useful in compositions which are faster curing and require lesser amounts of catalyst.

An additional advantage of the resins of the present invention is the unexpectedly low peak temperature—i.e., exotherm—reached during the curing of said resins. This lower peak temperature allows for easier fabrication and makes possible the preparation of thicker laminates having uniform properties. Also, products prepared from these resins exhibit less crazing, cracking, bubbling, warpage, and delamination.

It has also been found that the properties of the vinyl ester urethane resins of the present invention may be varied depending upon the value of y in the above-identified formula. Thus, it is possible to prepare a series of resins the properties of which are varied over a considerable range depending upon the ultimate use of the resin.

Finally, the vinyl ester urethanes may be prepared as solid materials making them particularly useful for a variety of applications.

In order to describe the present invention so that it may be more clearly understood, the following examples are set forth. These examples are given primarily for the purpose of illustration and any enumeration of detail contained therein should not be interpreted as a limitation on the concept of the present invention.

In the examples, the following standard tests, procedures, and components were employed:

Castings were prepared by pouring the resin-containing composition into a mold comprising two glass plates, each of which had previously been coated with a mold release agent, spaced ⅛ inch apart, and sealed together on three edges. After the composition was poured into the mold, the fourth edge was sealed and the composition was allowed to cure at room temperature for 24 hours. At the end of this time, the composition was postcured by heating in an oven at 100°C. for 4 hours after which it was cooled, removed from the mold, and tested.

Laminates were prepared by impregnating a fiberglass mat with the resin-containing composition. The procedure employed was as follows:

a. A sheet of polyethylene terephthalate film was placed on a flat surface and coated with a layer of the resin composition.
b. A continuous fiberglass mat was placed on this layer, pressed into intimate contact therewith, and coated with a layer of the resin composition.
c. A chopped fiberglass mat was placed on this layer, pressed into intimate contact therewith, and coated with a layer of the resin composition.
d. Similarly, a second chopped fiberglass mat, another continuous fiberglass mat, and a second sheet of polyethylene terephthalate film were added separated by layers of the resin-containing composition.

The resulting article was allowed to cure at room temperature for 24 hours. At the end of this time, it was postcured by heating in an oven at 100°C. for 4 hours. The polyethylene terephthalate films were removed and the physical properties of the laminate measured.

Cure properties—i.e., gel time, gel to peak time, and peak temperature—were measured in accordance with the following procedure:

100 grams of the resin-containing composition and catalyst were added to an 8-oz. jar and the mixture was stirred. The time interval between the addition of the catalyst and the point at which the free-flowing resin solution became stringy, as evidenced by the appearance of gelly-like masses, was recorded as "Gel Time." At this point, a thermocouple hooked to a recorder was inserted into the center of the composition to a point about one-half inch from the bottom of the jar. The interval between the gel time and the time at which the maximum exotherm temperature was reached is referred to as "Gel to Peak Time." The maximum exotherm temperature is referred to as "Peak Temperature."

Tensile strength was measured in accordance with A.S.T.M. Standard D-638-71a.

Flexural strength was measured in accordance with A.S.T.M. Standard D-790-71.

Barcol Hardness was determined in accordance with A.S.T.M. Standard D-2583-67.

Elongation was measured in accordance with A.S.T.M. Standard D-638-71a.

Heat distortion temperature (HDT) was measured in accordance with A.S.T.M. Standard D-648-72.

Charpy impact and Izod impact were determined in accordance with A.S.T.M. Standard D-256.

The acid number of the resin refers to the number of milligrams of potassium hydroxide required to neutralize one gram of the resin.

The percent free NCO was determined by titration employing the method described in Union Carbide Bulletin F-41146 entitled "Urethane Coatings Chemicals" at page 24.

The saponification number refers to the number of milligrams of potassium hydroxide required to saponify one gram of the resin.

The hydroxyl number refers to the number of milligrams of potassium hydroxide equivalent to the hyroxyl content of one gram of the resin.

The hydroxypropyl methacrylate employed had a purity of 96 percent by weight.

IONOL refers to an antioxidant identified as 2,6-ditert-butyl-4-methyl phenol available from Shell Chemical Company.

Examples 1 thru 3 illustrate the preparation of polyoxyalkylene bisphenol A derivatives useful in the preparation of the vinyl ester urethane resins of the present invention.

EXAMPLE 1

Preparation of Polyoxyalkylene Bisphenol A Maleate Diester

Into a two-liter reaction flask equipped with a stirrer, thermometer, nitrogen inlet tube, and distillation head, there were added 1,416 grams (4 mols) of polyoxypropylene bisphenol A containing an average of 2.2 mols of propylene oxide per mol of bisphenol A and 196 grams (2 mols) of maleic anhydride. The resulting reaction mixture was heated to from 210°C. to 215°C. and held at that temperature for 5 hours. At this time, the acid number had dropped to 11.7. Vacuum was then applied to the reaction mixture for 1 hour while maintaining the temperature at from 210°C. to 215°C. The vacuum was removed and the product was poured from the reaction flask. After cooling to room temperature, the product, identified as the diester of the polyoxypropylene bisphenol A, was an amber semisolid having an acid number of 8.9, a saponification number of 142, and a hydroxyl number of 145.

EXAMPLE 2

Preparation of Polyester of Polyoxyalkylene Bisphenol A

Into the reaction flask described in Example 1, there were added 1,350 grams (3.81 mols) of the polyoxypropylene bisphenol A described in Example 1 and 249 grams (2.54 mols) of maleic anhydride. The resulting reaction mixture was reacted as in Example 1. After cooling to room temperature, the resulting product, identified as the polyester derivative of the polyoxypropylene bisphenol A, was an amber-colored, low-melting solid having an acid number of 8.6, a saponification number of 181, and a hydroxyl number of 103.

EXAMPLE 3

Preparation of Polyester of Polyoxyalkylene Bisphenol A

Into the reaction flask described in Example 1, there were added 1,318 grams (3.72 mols) of the polyoxypropylene bisphenol A described in Example 1 and 274 grams (2.79 mols) of maleic anhydride. After reacting as in Example 1, the resultant amber solid was identified as a polyester derivative of the polyoxypropylene bisphenol A. The product had an acid number of 11, a saponification number of 202, and a hydroxyl number of 84.

In the following four examples, the vinyl ester urethane resins are prepared in a one-shot method employing a melt technique.

EXAMPLE 4

Into a suitable reaction vessel, there were added 788 grams (1.0 mol) of the diester prepared in Example 1 and 1.44 grams of hydroquinone. The resulting mixture was heated to 80°C. and 300 grams (2.0 mols) of hydroxypropyl methacrylate were added. To the resulting mixture, at a temperature of 80°C., there were added 348 grams (2.0 mols) of toluene diisocyanate over a period of 1 hour. When the addition was completed, the temperature of the reaction mixture had increased to 135°C. The reaction mixture was held at this temperature for an additional one-half hour and the molten resin removed from the reaction vessel. The resulting light-colored solid had a melting point of 97°C., an acid number of 7.6, a saponification number of 201, a hydroxyl number of 22, and no residual isocyanate. The resulting resin could be ground to a non-blocking white powder and formed a clear solution in styrene at 50 percent solids.

EXAMPLE 5

Into the reaction vessel described in Example 4, there were added 788 grams (1.0 mol) of the diester prepared in Example 1, 0.72 gram of hydroquinone, and 0.72 gram of IONOL. The reaction mixture was heated to 80°C. and there was then added 300 grams (2.0 mols) of hydroxypropyl methacrylate. To the resulting mixture, at a temperature of 74°C., there was added 348 grams (2.0 mols) of toluene diisocyanate over a period of 1 hour. When all of the isocyanate had been added, the reaction temperature was increased to 130°C. The reaction mixture was held at this temperature for one and one-half hours and the molten resin then removed from the reaction vessel. The resulting white-colored, solid resin had a melting point of 94°C., an acid number of 6.2, a saponification number of 205, and a hydroxyl number of 20.6. There was no residual isocyanate in the resin. The resin could be ground to a non-blocking white powder and formed a clear solution at 50 percent solids in styrene.

EXAMPLE 6

Into the reaction vessel described in Example 4, there were added 788 grams (1.0 mol) of the diester prepared in Example 1, 0.67 gram of hydroquinone, and 0.67 gram IONOL. The resulting reaction mixture was heated to 88°C. and 255 grams (1.7 mols) of hydroxypropyl methacrylate were added. To the resulting reaction mixture, at a temperature of 69°C., there were added 296 grams (1.7 mols) of toluene diisocyanate over a period of 33 minutes. At the end of this time, the temperature of the reaction mixture had increased to 125°C. The temperature was maintained at between 125°C. and 130°C. for 30 minutes. Upon cooling, there resulted a white-colored, solid resin having a melting point of 93°C., an acid number of 6.1, a saponification number of 199, and a hydroxyl number of 26.4. The resin could be ground to a non-blocking white powder and formed a clear solution at 50 percent solids in styrene.

EXAMPLE 7

Into the reaction vessel described in Example 4, there were added 788 grams (1.0 mol) of a diester prepared as in Example 1, 0.62 gram of hydroquinone, and 0.62 gram of IONOL. The resulting reaction mixture was heated to 93°C. and 210 grams (1.4 mols) of hydroxypropyl methacrylate were added. To the resulting reaction mixture, at a temperature of 78°C., there were added 243 grams (1.4 mols) of toluene diisocyanate over a period of 31 minutes. At the end of this time, the reaction mixture had increased to 121°C. The mixture was maintained at a temperature of from 121°C. to 131°C. for an additional 30 minutes. Upon cooling, there resulted a solid, light-colored resin having a melting point of 88°C., an acid number of 6.5, a saponification number of 171, a hydroxyl number of 46.6, and no residual isocyanate. The resin could be ground to a non-blocking white powder and formed a clear solution in styrene at 50 percent solids.

In the following four examples, the vinyl ester urethane resins are prepared in a one-shot method in styrene.

EXAMPLE 8

Into a reaction vessel, there were added 394 grams (0.5 mol) of a diester prepared as in Example 1 dissolved in 394 grams of styrene, 150 grams (1.0 mol) of hydroxypropyl methacrylate, 324 grams of styrene, 0.16 gram of hydroquinone, 0.36 gram of IONOL, and 174 grams (1.0) mol of toluene diisocyanate. The resulting reaction mixture was heated to from 85°C. to 90°C. for 1 hour and from 80°C. to 85°C. for 3 hours. There resulted an amber-colored clear solution of the vinyl ester urethane resin in styrene having an acid number of 3.3., a saponification number of 94.9, a hydroxyl number of 14.9, and a percent free NCO of 0.49.

EXAMPLE 9

Into the reaction vessel described in Example 8, there were added 394 grams (0.5 mol) of a diester prepared as in Example 1 dissolved in 394 grams of styrene. There were then added 127.5 grams (0.85 mol) of hydroxypropyl methacrylate, 27.6 grams of styrene, 0.14 gram of hydroquinone, 0.34 gram of IONOL, and 148 grams (0.85 mol) of toluene diisocyanate. The resulting reaction mixture was heated as in Example 8, resulting in an amber-colored clear liquid of the vinyl ester urethane resin dissolved in styrene. The product had an acid number of 3.4, a saponification number of 93.8, a hydroxyl number of 19.3, and a percent free NCO of 0.49.

EXAMPLE 10

Into the reaction vessel described in Example 8, there were added 394 grams (0.50 mol) of a diester prepared as in Example 1 dissolved in 394 grams of styrene. There were then added 105 grams (0.7 mol) of hydroxypropyl methacrylate, 227 grams of styrene, 0.11 gram of hydroquinone, 0.31 gram IONOL, and 121 grams (0.7 mol) of toluene diisocyanate. The resulting reaction mixture was heated as in Example 8, resulting in an amber-colored clear solution having an acid number of 3.3, a saponification number of 93.6, a hydroxyl number of 24.5, and a percent free NCO of 0.42.

EXAMPLE 11

Into a reaction vessel as described in Example 8, there were added 83 grams (0.55 mol) of hydroxypropyl methacrylate, 90 grams (0.52 mol) of toluene diisocyanate, 173 grams of styrene, 0.08 gram of hydroquinone, 0.38 gram of stannous octoate, and a solution of 205 grams (0.26 mol) of a diester prepared as in Example 1, dissolved in 205 grams of styrene. The resulting reaction mixture was heated to a temperature of from 50° to 55°C. for 6 hours. There resulted an amber-colored clear liquid having an acid number of 3.2, a saponification number of 106, a hydroxyl number of 13, and a percent free NCO of 0.19.

In the following nine examples, the vinyl ester urethane resins were prepared employing a prepolymer technique in which the toluene diisocyanate was first reacted with the hydroxypropyl methacrylate and the product reacted with the polyoxyalkylene bisphenol A derivative. All of these examples were prepared in two steps. In step A, hydroxypropyl methacrylate (HPMA) was combined with toluene diisocyanate (TDI) in styrene and in the presence of hydroquinone. The resulting reaction mixture was heated for the times and temperatures indicated in the examples. The resulting product was then combined with a polyoxyalkylene bisphenol A derivative (BPA deriv) as is also indicated in the examples. In the examples, the following bisphenol A derivatives were employed:

I. Refers to a bisphenol A derivative prepared as described in Example 1 above.
II. Refers to a bisphenol A derivative prepared as in Example 2 above.
III. Refers to a bisphenol A derivative prepared as in Example 3 above. The bisphenol A derivative, as a 50 percent by weight solution in styrene, was added to product of step one and the resulting reaction mixture heated for the time and temperatures indicated in the examples. All of the products were an amber-colored clear liquid.

STEP A

| EXAMPLE | TDI (gms.) | TDI (mols) | HPMA (gms.) | HPMA (mols) | STYRENE (gms.) | HYDROQUINONE (gms.) | TIME (hrs.) | TEMP. (°C.) |
| --- | --- | --- | --- | --- | --- | --- | --- | --- |
| 12 | 77 | 0.44 | 66 | 0.44 | 143 | .08 | 1.5 | 50–55 |
| 13 | 90 | 0.52 | 75 | 0.50 | 165 | .08 | 2.0 | 50–55 |
| 14 | 70 | 0.40 | 58 | 0.39 | 128 | .08 | 2.0 | 50–55 |
| 15 | 60 | 0.34 | 48 | 0.32 | 108 | .07 | 2.0 | 50–55 |
| 16 | 77 | 0.44 | 68 | 0.45 | 145 | .08 | 2.0 | 50–55 |
| 17 | 77 | 0.44 | 70 | 0.47 | 147 | .08 | 2.0 | 50–55 |
| 18 | 90 | 0.52 | 80 | 0.53 | 157 | .08 | 2.0 | 50–55 |
| 19 | 90 | 0.52 | 83 | 0.55 | 173 | .08* | 2.0 | 50–55 |
| 20 | 724 | 4.16 | 676 | 4.5 | 700 | .68 | 2.0 | 50–55 |

*plus 0.38 gms. stannous octoate
*plus 0.36 gms. Ionol

STEP B

| EXAMPLE | TYPE | BPA DERIVATIVE AMOUNT (gms.) | BPA DERIVATIVE AMOUNT (mols) | STYRENE (gms.) | TIME (hrs.) | TEMP. (°C.) |
| --- | --- | --- | --- | --- | --- | --- |
| 12 | I | 205 | 0.26 | 205 | 5.5 | 50–55 |
| 13 | I | 205 | 0.26 | 205 | 5.5 | 50–55 |
| 14 | II | 242.5 | 0.20 | 242.5 | 5.5 | 50–55 |
| 15 | III | 276 | 1.67 | 276 | 5.5 | 50–55 |
| 16 | I | 205 | 0.26 | 205 | 5.5 | 50–55 |
| 17 | I | 205 | 0.26 | 205 | 5.5 | 50–55 |
| 18 | I | 205 | 0.26 | 205 | 5.5 | 50–55 |
| 19 | I | 205 | 0.26 | 205 | 4.5 | 50–55 |
| 20 | I | 1640 | 2.08 | 1640 | 5.0 | 50–55 |

In the following three examples, the vinyl ester urethane resins were prepared by a prepolymer technique in which the toluene diisocyanate and hydroxypropyl methacrylate were first reacted and the resulting reaction product was combined with the bisphenol A derivative.

EXAMPLE 21

Into a suitable reaction vessel, there were added 150 grams (1.0 mol) of hydroxypropyl methacrylate, 174 grams (1.0 mol) of toluene diisocyanate, 324 grams of styrene, 0.16 gram of hydroquinone, and 0.36 gram of IONOL. The resulting reaction mixture was heated to 35°C. at which time the heat was removed. During the course of the reaction, the temperature of the mixture increased to 66°C. At the end of 1 hour, the reaction mixture was at a temperature of 58°C. and 394 grams (0.5 mol) of a polyoxyalkylene bisphenol A maleate prepared as described in Example 1 were added dissolved in 394 grams of styrene. The reaction mixture was heated to 80° to 85°C. and maintained at this temperature for 4 hours. At the end of this time, there resulted an amber-colored clear liquid having an acid number of 3.3, a saponification number of 108, a hydroxyl number of 15.3, and a percent free NCO of 0.09.

EXAMPLE 22

A second reaction mixture was prepared as described in Example 21. However, following the addition of the polyoxyalkylene bisphenol A maleate, the reaction mixture was maintained at a temperature of from 50° to 55°C. for 5 hours. The resulting product was an amber-colored clear liquid having an acid number of 3.4, a saponification number of 109, a hydroxyl number of 22, and a percent free NCO of 0.67.

EXAMPLE 23

Into the reaction vessel described in Example 21, there were added 162 grams (1.08 mols) of hydroxypropyl methacrylate, 174 grams (1.0 mol) of toluene diisocyanate, 336 grams of styrene, 0.16 gram of hydroquinone, and 0.36 gram of IONOL. The resulting reaction mixture was heated to 35°C. at which time the heating was discontinued and the reaction allowed to continue. The urethane reaction exotherm increased the temperature of the reaction mixture to 66°C. After 1 hour, and at a temperature of 62°C., there were added to the reaction mixture 394 grams (0.5 mol) of a polyoxyalkylene bisphenol A maleate prepared as described in Example 1 dissolved in 394 grams of styrene. The resulting reaction mixture was maintained at a temperature of from 80° to 85°C. for 4 hours. At the end of this time, there resulted an amber-colored clear liquid having an acid number of 3.3, a saponification number of 113, a hydroxyl number of 17.6, and a percent free NCO of 0.46.

In the following two examples, the vinyl ester urethane resins are prepared by first reacting the bisphenol A derivative with toluene diisocyanate in styrene and combining the resulting product with hydroxypropyl methacrylate.

EXAMPLE 24

Into a suitable reaction vessel, there was added a solution of 188 grams (0.24 mol) of a polyoxyalkylene bisphenol A maleate prepared as described in Example 1 dissolved in 188 grams of styrene. There was then added 90 grams (0.52 mol) of toluene diisocyanate, 168 grams of styrene, and 0.08 gram of hydroquinone. The resulting reaction mixture was maintained at a temperature of from 50° to 55°C. for 2 hours. At the end of this time, there were added 78 grams (0.52 mol) of hydroxypropyl methacrylate and the resulting mixture was heated at a temperature of from 50°C. to 55°C. for an additional 5 hours. At the end of this time, there resulted an amber-colored clear liquid having an acid number of 3.4, a saponification number of 104, a hydroxyl number of 19.5, and a percent free NCO of 0.46.

EXAMPLE 25

Into a suitable reaction vessel, there was added a solution of 394 grams (0.5 mol) of a diester prepared as in Example 1 dissolved in 394 grams of styrene. There were then added 174 grams (1.0 mol) of toluene diisocyanate, 324 grams of styrene, 0.16 gram of hydroquinone, and 0.36 gram of IONOL. The resulting reaction mixture was heated to 45°C. and heating was discontinued. The reaction was allowed to continue during which time the temperature of the reaction mixture increased to 56°C. At the end of 1 hour, and at a temperature of 53°C., there were added 150 grams (1.0 mol) of hydroxypropyl methacrylate and the resulting reaction mixture was heated to a temperature of from 80° to 85°C. and maintained at that temperature for 5 hours. At the end of this time, there resulted an amber-colored clear liquid having an acid number of 2.8, a saponification number of 103, a hydroxyl number of 17.5, and a percent free NCO of 0.41.

In the following example, a vinyl ester urethane resin is prepared by first combining the bisphenol A derivative with hydroxypropyl methacrylate and, subsequently, reacting the product with toluene diisocyanate.

EXAMPLE 26

Into a suitable reaction vessel, there were added 394 grams (0.50 mol) of a polyoxyalkylene bisphenol A prepared as described in Example 1 dissolved in 394 grams of styrene. There were then added 150 grams (1.0 mol) of hydroxypropyl methacrylate, 324 grams of styrene, and 0.16 gram of hydroquinone. The resulting reaction mixture was heated to 45°C. and 174 grams (1.0 mol) of toluene diisocyanate were added over a period of 1 hour. At the end of this time, the reaction mixture was maintained at a temperature of from 75° to 80°C. for a period of 4 1/2 hours. The resulting product was an amber-colored clear liquid.

EXAMPLE 27

Into a suitable reaction vessel, there were added 348 grams (2 mols) of toluene diisocyanate. While maintaining the temperature at between 45° and 50°C. by external cooling, there were added, over a period of 1 hour, 285 grams (2.06 mols) of hydroxyethyl methacrylate having a purity of 94 percent by weight. After the addition was completed, the reaction mixture was maintained at a temperature of from 45° to 50°C. for an additional 4 hours. At the end of this time, the reaction mixture was cooled resulting in a white solid identified as the monourethane derivative. In a suitable reaction flask, there were combined 140 grams (0.44 mol) of the above-identified monourethane derivative, 205 grams (0.26 mol) of a polyoxyalkylene bisphenol A maleate prepared as described in Example 1, and 345 grams of styrene. The resulting reaction mixture was maintained at a temperature of 50°C. for 8 hours. At the end of this time, there resulted an amber-colored clear liquid having an acid number of 3.5, a saponification number of 93, and a hydroxyl number of 19.0.

EXAMPLE 28

Into the reaction flask described in Example 1, there were added 1,348 grams (3.80 mols) of polyoxypropylene bisphenol A containing an average of 2.2 mols of propylene oxide per mol of bisphenol A and 310 grams (3.16 mols) of maleic anhydride. The resulting reaction mixture was heated to from 210° to 215°C. and maintained at this temperature for 5 hours. At the end of this time, the acid number was 25.8. Vacuum was then applied to the reaction mixture for a period of 1½ hours while maintaining the temperature at from 210° to 215°C. The vacuum was then removed, 0.8 gram of hydroquinone was added, and the reaction mixture was stirred for 10 minutes. When cooled to room temperature, the resulting polyester had an acid number of 12.2, a saponification number of 217, and a hydroxyl number of 68.

Into a suitable reaction vessel, there were added 75 grams (0.5 mol) of hydroxypropyl methacrylate, 87 grams (0.5 mol) of toluene diisocyanate, 162 grams of styrene, 0.08 gram of hydroquinone, and 0.39 gram of IONOL. The reaction mixture was heated to from 35° to 70°C. for 1 hour. At this time, there was added 1,262 grams (0.25 mol) of the polyester prepared as described above. The polyester was added as a 50 percent by weight solution in styrene. The resulting reaction mixture was maintained at a temperature of from 80° to 85°C. for 4 hours. There resulted an amber-colored clear liquid that became thixotropic on standing.

EXAMPLE 29

Into a reaction vessel, there were added 75 grams (0.5 mol) of hydroxypropyl methacrylate, 87 grams (0.5 mol) of toluene diisocyanate, 162 grams of styrene, 0.08 gram of hydroquinone, and 0.27 gram of IONOL. The resulting mixture was heated to from 35° to 70°C. for 1 hour. At this time, there was added 394 grams (0.5 mol) of a diester prepared as in Example 1 dissolved in 394 grams of styrene. The resulting reaction mixture was heated to from 80° to 85°C. and maintained at that temperature for 4 hours. The resulting product was an amber-colored clear liquid that became thixotropic on standing.

EXAMPLE 30

Into a reaction vessel, there was added 394 grams (0.5 mol) of a diester prepared as in Example 1 dissolved in 394 grams of styrene. There was then added 174 grams (1.0 mol) of toluene diisocyanate, 0.12 gram of hydroquinone, and 0.32 gram of IONOL. The resulting reaction mixture was heated to from 35° to 50°C. for 1 hour. At the end of this time, there was added 75 grams (0.5 mol) of hydroxypropyl methacrylate. The resulting mixture was heated to from 50° to 55°C. and maintained at that temperature for 5 hours. The resulting product was an amber-colored clear liquid which became thixotropic on standing.

EXAMPLE 31

Into the reaction flask described in Example 1, there were added 1,990 grams (3.0 mols) of polyoxypropylene tetrabromobisphenol A containing an average of 2.2 mols of propylene oxide per mol of tetrabromobisphenol A and 147 grams (1.5 mols) of maleic anhydride. The resulting reaction mixture was heated to 185° to 190°C. and maintained at that temperature for 5 hours. At the end of this time, the acid number of 12.9. Vacuum was then applied to the reaction mixture for 1½ hours while maintaining the temperature at from 185° to 190°C. The vacuum was removed, 1.05 grams of hydroquinone were added, and the reaction mixture was stirred for 10 minutes. After cooling to room temperature, the product, identified as the diester of the polyoxypropylene tetrabromobisphenol A, had an acid number of 6.1, a saponification number of 91.4, and a hydroxyl number of 99.

Into a suitable reaction vessel, there were added 150 grams (1.0 mol) of hydroxypropyl methacrylate, 174 grams (1.0 mol) of toluene diisocyanate, 216 grams of styrene, 0.16 gram of hydroquinone, and 0.51 gram of IONOL. The resulting reaction mixture was heated to from 35° to 70°C. for 1 hour. At the end of this time, there was added 703 grams (0.5 mol) of the diester prepared above dissolved in 469 grams of styrene. The resulting reaction mixture was heated to from 80° to 85°C. and maintained at that temperature for 4 hours. At the end of this time, there resulted an amber-colored clear liquid that became slightly thixotropic on standing.

EXAMPLE 32

Into the reaction flask described in Example 1, there were added 2,022 grams (3.0 mols) of the polyoxypropylene tetrabromobisphenol A described in Example 31 and 196 grams (2.0 mols) of maleic anhydride. The resulting reaction mixture was heated to from 185° to 190°C. and maintained at that temperature for 5 hours. At this time, the acid number was 16.2. Vacuum was then applied to the reaction mixture for 1½ hours while maintaining the temperature at 185° to 190°C. At the end of this time, the vacuum was removed, 1.1 grams of hydroquinone were added, and the reaction mixture was stirred for 10 minutes. After cooling to room temperature, the product, identified as the polyester derivative of the polyoxypropylene tetrabromobisphenol A, had an acid number of 8.8, a saponification number of 115, and a hydroxyl number of 68.

Into a suitable reaction vessel, there were added 108 grams (0.72 mol) of hydroxypropyl methacrylate, 125 grams (0.72 mol) of toluene diisocyanate, 155 grams of styrene, 0.11 gram of hydroquinone, and 0.5 gram of IONOL. The resulting reaction mixture was heated to from 35° to 70°C. for 1 hour. At the end of this time, there was added 786 grams (0.36 mol) of the polyester prepared above dissolved in 524 grams of styrene. The resulting reaction mixture was heated to from 80° to 85°C. and maintained at that temperature for 4 hours. The resulting product was an amber-colored clear liquid that became slightly thixotropic on standing.

EXAMPLE 33

Into the reaction flask described in Example 1, there was added 1,454 grams (3.62 mols) of a polyoxypropylene bisphenol A containing an average of 3.0 mols of propylene oxide per mol of bisphenol A, and 178 grams (1.82 mols) of maleic anhydride. The resulting reaction mixture was heated to from 210° to 215°C. and maintained at that temperature for 5 hours. At the end of this time, the acid number of 19.6. Vacuum was then applied to the reaction mixture for 1½ hours while maintaining the temperature at from 210° to 215°C. The vacuum was then removed, 0.81 gram of hydroquinone was added, and the reaction mixture stirred for 10 minutes. After cooling to room temperature, the product, identified as the diester of the polyoxypropylene bisphenol A, had an acid number of 7.6, a saponification number of 127, and a hydroxyl number of 132.

Into a suitable reaction vessel, there were added 150 grams (1.0 mol) of hydroxypropyl methacrylate, 174 grams (1.0 mol) of toluene diisocyanate, 324 grams of styrene, 0.16 gram of hydroquinone, and 0.36 gram of IONOL. The resulting reaction mixture was heated to from 35° to 70°C. for 1 hour. At the end of this time, there was added 442 grams (0.5 mol) of the diester prepared above dissolved in 442 grams of styrene. The resulting reaction mixture was heated to from 80° to 85°C. and maintained at that temperature for 4 hours. The resulting product was an amber-colored clear liquid which exhibited little evidence of becoming thixotropic.

EXAMPLE 34

Into the reaction flask described in Example 1, there were added 1,468 grams (3.24 mols) of a polyoxypropylene bisphenol A containing an average of 4.0 mols of propylene oxide per mol of bisphenol A and 159 grams (1.62 mols) of maleic anhydride. The resulting reaction mixture was heated to from 210° to 215°C. and maintained at that temperature for 5 hours. At this time, the acid number was 17.7. Vacuum was then applied to the reaction mixture for 1½ hours while maintaining the temperature at from 210° to 215°C. The vacuum was then removed, 0.81 gram of hydroquinone was added, and the reaction mixture was stirred for 10 minutes. After cooling to room temperature, the product, identified as the diester of the polyoxypropylene bisphenol A, had an acid number of 8.1, a saponification number of 112, and a hydroxyl number of 118.

Into a suitable reaction vessel, there were added 150 grams (1.0 mol) of hydroxypropyl methacrylate, 174 grams (1.0 mol) of toluene diisocyanate, 324 grams of styrene, 0.16 gram of hydroquinone, and 0.36 gram of IONOL. The resulting reaction mixture was heated to from 35° to 70°C. for 1 hour. At the end of this time, there was added 493 grams (0.5 mol) of the diester prepared above dissolved in 493 grams of styrene. The resulting reaction mixture was heated to from 80° to 85°C. and maintained at that temperature for 4 hours. The resulting product was an amber-colored clear liquid.

EXAMPLE 35

Into a reaction vessel, there were added 208 grams (1.0 mol) of a hydroxyalkyl methacrylate prepared by reacting 2 mols of propylene oxide with each mol of methacrylic acid, 174 grams (1.0 mol) of toluene diisocyanate, 382 grams of styrene, 0.19 gram of hydroquinone, and 0.38 gram of IONOL. The resulting reaction mixture was heated to from 35° to 70°C. for 1 hour. At this time, there was added 394 grams (0.5 mol) of a diester prepared as in Example 1 dissolved in 394 grams of styrene. The resulting reaction mixture was heated to from 80° to 85°C. and maintained at that temperature for 4 hours. There resulted an amber-colored clear liquid having an acid number of 0.7, a saponification number of 89, a hydroxyl number of 19.5, and a percent free NCO of 0.2.

EXAMPLE 36

Into a reaction vessel, there was added 263 grams (1.0 mol) of a hydroxyalkyl methacrylate prepared by reacting 3 mols of propylene oxide with each mol of methacrylic acid, 174 grams (1.0 mol) of toluene diisocyanate, 437 grams of styrene, 0.21 gram of hydroquinone, and 0.41 gram of IONOL. The resulting reaction mixture was heated to from 35° to 70°C. for 1 hour. At the end of this time, there was added 394 grams of a diester prepared as described in Example 1 dissolved in 394 grams of styrene. The resulting reaction mixture was heated to from 80° to 85°C. and maintained at that temperature for 4 hours. The resulting product was an amber-colored clear liquid having an acid number of 0.7; a saponification number of 83; a hydroxyl number of 18; and a percent free NCO, when measured as in Example 34, of 0.2.

EXAMPLE 37

A composition was prepared comprising:
100 grams of a vinyl ester urethane resin prepared as in Example 10
0.2 gram of dimethylaniline
1.0 gram of cobalt naphthenate containing 6 percent by weight cobalt
1.0 gram of a 60 percent solution of methyl ethyl ketone peroxide in dimethyl phthalate This composition had the following cure properties:

| | |
|---|---|
| Gel Time (mins.) | 28 |
| Peak Time (mins.) | 10 |
| Peak Temperature (°C.) | 151 |

Castings prepared from this composition had the following physical properties:

| | |
|---|---|
| Tensile strength (psi) | 10,700 |
| Flexural strength (psi) | 21,600 |
| Elongation (%) | 2.70 |
| Barcol hardness | 37–41 |
| Heat distortion temperature (°C.) | 113.5 |
| Charpy impact | 7.52 |

Laminates prepared from this composition had the following physical properties:

| | |
|---|---|
| Tensile strength (psi) | 13,800 |
| Flexural strength (psi) | 15,300 |
| Elongation (%) | 1.61 |
| Barcol hardness | 40–43 |
| Izod impact | 5.3 |

The corrosion resistance of the cured resin was evaluated by exposing laminates prepared as described above to aqueous solutions of corrosive materials at elevated temperatures for an extended period of time. The chemicals employed in these solutions, the concentration of chemical in the solution, the temperature of exposure, and the length of exposure are given in the following table. After aging, the flexural strength of the laminate was again measured. The percentage of the original flexural strength retained by the laminates after exposure to the corrosive media are also given in the following table:

TABLE

| Chemical | Percent | Temp. (°F.) | Time (Months) | Flexural Strength (% Retained) |
|---|---|---|---|---|
| H₂SO₄ | 25 | 200 | 6 | 91 |
| HNO₃ | 5 | 200 | 6 | 61 |
| HAc | 25 | 200 | 6 | 61 |
| HCl | 15 | 200 | 6 | 65 |
| NaOH | 5 | 200 | 6 | 54 |
| Alum | 5 | 200 | 6 | 76 |
| NaOCl | 5.25 | 125 | 6 | 93 |

What is claimed is:

1. A vinyl ester urethane resin having the following formula: R $+$A—M$+$$_y$ A—I—B
wherein
A is a radical derived from a polyoxyalkalene bisphenol A having the following formula:

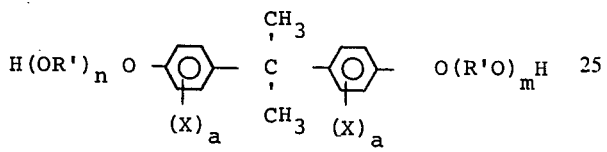

wherein
R' is an alkylene group,
X is halogen or methyl,
a is an integer equal to from 0 to 2, and
m and n are integers each of which is equal to at least 1 and the sum of which is equal to from about 2 to about 6;
M is a radical derived from an unsaturated, aliphatic, dicarboxylic acid or an anhydride thereof;
I is a radical derived from a diisocyanate;
B is a radical derived from a hydroxy-terminated ester of acrylic or methacrylic acid;
y is an integer equal to from 1 to about 5; and
R is selected from the group consisting of hydroxyl, I, and I—B, wherein I and B are as defined above.

2. A vinyl ester urethane resin as claimed in claim 1 wherein the bisphenol A has the following formula:

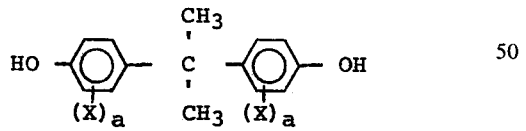

wherein X is selected from the group consisting of halogen and methyl, and a is an integer equal to 1 or 2.

3. A vinyl ester urethane resin as claimed in claim 2 wherein X is selected from the group consisting of bromine, chlorine, and fluorine.

4. A vinyl ester urethane resin as claimed in claim 1 wherein the sum of m and n is equal to from about 2 to about 4.

5. A vinyl ester urethane resin as claimed in claim 1 wherein the dicarboxylic acid or anhydride thereof is selected from the group consisting of fumaric acid, maleic acid, and maleic anhydride.

6. A vinyl ester urethane resin as claimed in claim 1 wherein y is equal to 1.

7. A vinyl ester urethane resin as claimed in claim 1 wherein the diisocyanate is selected from the group consisting of toluene diisocyanate and methylene diisocyanate.

8. A vinyl ester urethane resin as claimed in claim 7 wherein the diisocyanate is toluene diisocyanate.

9. A vinyl ester urethane resin as claimed in claim 1 wherein R is hydroxyl.

10. A vinyl ester urethane resin as claimed in claim 1 wherein R is the residue of a diisocyanate.

11. A vinyl ester urethane resin as claimed in claim 1 wherein R is I—B.

12. A vinyl ester urethane resin as claimed in claim 1 wherein the hydroxyl-terminated ester of acrylic or methacrylic acid has the following formula:

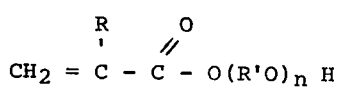

wherein
R is hydrogen or methyl,
R' is an alkylene group containing 2 or 3 carbon atoms, and
n is an integer equal to from 1 to about 3.

13. A vinyl ester urethane resin as claimed in claim 12 wherein n is equal to from 1 to about 2.

14. A vinyl ester urethane resin as claimed in claim 1 wherein the hydroxyl-terminated ester is hydroxypropyl methacrylate.

15. A method of preparing a vinyl ester urethane resin, said method comprising:
a. preparing a bisphenol A derivative by reacting a polyoxyalkylene bisphenol A having the following formula:

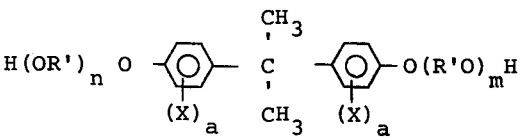

wherein
R' is an alkylene group,
X is halogen or methyl,
a is an integer equal to from 0 to 2, and
m and n are integers each of which is equal to at least 1 and the sum of which is equal to from about 2 to about 6;
with an unsaturated, aliphatic, dicarboxylic acid or an anhydride thereof in a mole ratio of alkoxylated bisphenol A to dicarboxylic acid or anhydride equal to from about 2:1 to about 6:5; and
b. reacting the bisphenol A derivative with a diisocyanate and a hydroxyl-terminated ester of acrylic or methacrylic acid.

16. A method as claimed in claim 16 wherein R' is an alkylene group containing from 2 to 3 carbon atoms.

17. A method as claimed in claim 16 wherein X is halogen.

18. A method as claimed in claim 16 wherein X is selected from the group consisting of bromine, chlorine, and fluorine.

19. A method as claimed in claim 16 wherein the sum of m and n is equal to from about 2 to about 4.

20. A method as claimed in claim 15 wherein the dicarboxylic acid or anhydride thereof is selected from the group consisting of fumaric acid, maleic acid, and maleic anhydride.

21. A method as claimed in claim 20 wherein the dicarboxylic acid or anhydride thereof is maleic anhydride.

22. A method as claimed in claim 15 wherein the molar ratio of polyoxyalkylene bisphenol A to acid or anhydride is equal to from about 2:1 to about 6:5.

23. A method as claimed in claim 15 wherein the diisocyanate is selected from the group consisting of toluene diisocyanate and methylene diisocyanate.

24. A method as claimed in claim 23 wherein the diisocyanate is toluene diisocyanate.

25. A method as claimed in claim 15 wherein the amount of diisocyanate is equal to at least 1 mol per mol of bisphenol A derivative.

26. A method as claimed in claim 16 wherein the amount of diisocyanate is equal to from about 1.4 mols to about 2.5 mols per mol of bisphenol A derivative.

27. A method as claimed in claim 15 wherein the hydroxylterminated ester of acrylic or methacrylic acid has the following formula:

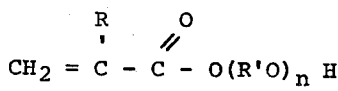

wherein
R is hydrogen or methyl,
R' is an alkylene group containing 2 or 3 carbon atoms, and
$n$ is an integer equal to from 1 to about 3.

28. A method as claimed in claim 27 wherein $n$ is equal to from 1 to about 2.

29. A method as claimed in claim 15 wherein the hydroxyl-terminated ester is hydroxypropyl methacrylate.

30. A method as claimed in claim 15 wherein the amount of hydroxyl-terminated ester of acrylic or methacrylic acid is equal to at least 1 mol per mol of bisphenol A derivative.

31. A method as claimed in claim 15 wherein the amount of hydroxyl-terminated ester of acrylic or methacrylic acid is equal to about 1 mol per mol of bisphenol A derivative.

32. A method as claimed in claim 15 wherein the bisphenol A derivative is reacted with the diisocyanate and the hydroxyl-terminated ester of acrylic or methacrylic acid in the presence of a solvent.

33. A method as claimed in claim 32 wherein the solvent is a vinyl monomer.

34. A method as claimed in claim 33 wherein the vinyl momomer is styrene.

35. A method as claimed in claim 15 wherein the diisocyanate is first reacted with the hydroxyl-terminated ester of acrylic or methacrylic acid and the resulting product is reacted with the bisphenol A derivative.

36. A composition comprising
(a) a vinyl ester urethane resin having the following formula:

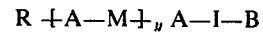

wherein
A is a radical derived from a polyoxyalkalene bisphenol
A having the following formula: 55/8
wherein
R' is an alkylene group,
X is halogen or methyl,
$a$ is an integer equal to from 0 to 2, and
$m$ and $n$ are integers each of which is equal to at least 1 and the sum of which is equal to from about 2 to about 6;
M is the residue of an unsaturated, aliphatic, dicarboxylic acid or an anhydride thereof;
I is the residue of a diisocyanate;
B is the residue of a hydroxyl-terminated ester of acrylic or methacrylic acid;
y is an integer equal to from 1 to about 5; and
R is selected from the group consisting of hydroxyl, I, and I—B, wherein I and B are as defined above; and
b. a vinyl monomer.

37. A composition as claimed in claim 36 wherein the vinyl monomer is styrene.

* * * * *

UNITED STATES PATENT OFFICE
CERTIFICATE OF CORRECTION

PATENT NO. : 3,876,726
DATED : April 8, 1975
INVENTOR(S) : Ernest C. Ford, Jr. and Alfred J. Restaino It is certified that error appears in the above-identified patent and that said Letters Patent are hereby corrected as shown below:

Column 5, line 4, "be" should read -- by --.

Column 20, line 59, "16" should read -- 15 --.

Column 20, line 61, "16" should read -- 15 --.

Column 20, line 63, "16" should read -- 17 --.

Column 20, line 66, "16" should read -- 15 --.

Column 21, line 19, "16" should read -- 15 --.

Column 22, lines 21-25 should read -- wherein

A is a radical derived from a polyoxyalkalene bisphenol A having the following formula:

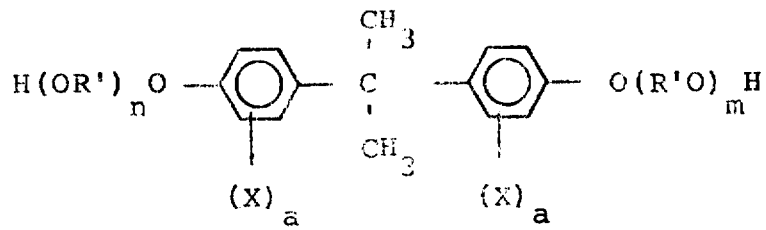

wherein --.

Signed and Sealed this fourth Day of November 1975

[SEAL]

Attest:

RUTH C. MASON
Attesting Officer

C. MARSHALL DANN
Commissioner of Patents and Trademarks